(12) United States Patent
Lee et al.

(10) Patent No.: US 11,979,483 B2
(45) Date of Patent: May 7, 2024

(54) ENCRYPTION APPARATUS AND METHOD OF AN IMAGE

(71) Applicant: RESEARCH & BUSINESS FOUNDATION SUNGKYUNKWAN UNIVERSITY, Suwon-si (KR)

(72) Inventors: Yeon Ho Lee, Seongnam-si (KR); Jae Hun Song, Seoul (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 296 days.

(21) Appl. No.: 17/694,810

(22) Filed: Mar. 15, 2022

(65) Prior Publication Data

US 2022/0345291 A1 Oct. 27, 2022

(30) Foreign Application Priority Data

Apr. 27, 2021 (KR) .................. 10-2021-0054351

(51) Int. Cl.
*H04L 9/06* (2006.01)
*H04N 1/44* (2006.01)

(52) U.S. Cl.
CPC ............. *H04L 9/06* (2013.01); *H04N 1/4486* (2013.01)

(58) Field of Classification Search
CPC ....... H04L 9/06; H04L 9/0618; H04N 1/4486; H04N 21/2347; H04N 21/26613
See application file for complete search history.

(56) References Cited

U.S. PATENT DOCUMENTS

| 5,031,038 | A | * | 7/1991 | Guillemot | ............ G06F 17/147 708/401 |
| 9,735,996 | B2 | * | 8/2017 | Kim | ...................... G06F 17/142 |
| 10,915,319 | B2 | | 2/2021 | Meixner | |
| 2003/0182246 | A1 | | 9/2003 | Johnson et al. | |
| 2003/0206582 | A1 | | 11/2003 | Srinivasan et al. | |

FOREIGN PATENT DOCUMENTS

| KR | 10-0965704 B1 | 6/2010 |
| KR | 10-2019-0139483 A | 12/2019 |
| WO | WO 2020/060832 A1 | 3/2020 |

OTHER PUBLICATIONS

Saybasili, A. Beliz, et al. "Highly Parallel Multi-Dimentional Fast Fourier Transform On Fine-and Coarse-Grained Many-Core Approaches." PDCS'09: The 21st IASTED International Conference on Parallel and Distributed Computing and Systems. 2009., (8 pages).

* cited by examiner

*Primary Examiner* — Quazi Farooqui
(74) *Attorney, Agent, or Firm* — NSIP Law (57) ABSTRACT

An encryption method, includes performing, by an encryption system, bit reversal permutation of pixel data of a 2D image, arranging the pixel data as first-pixel data, and applying the 2D image to a butterfly algorithm of fast Fourier transform; determining, by the encryption system, a plurality of data paths based on the first-pixel data; and performing, by the encryption system, a first encryption of the first-pixel data into second-pixel data on a specific data path based on a number of the specific data path among the plurality of data paths.

11 Claims, 5 Drawing Sheets

ENCRYPTION APPARATUS AND METHOD OF AN IMAGE

CROSS-REFERENCE TO RELATED APPLICATIONS

This application claims the benefit under 35 USC 119(a) of Korean Patent Application No. 10-2021-0054351 filed on Apr. 27, 2021, in the Korean Intellectual Property Office, the entire disclosure of which is incorporated herein by reference for all purposes.

BACKGROUND

1. Field

The following description relates to an encryption apparatus and method of an image.

2. Description of Related Art

Today, the rapid development of communications and networks has brought the convenience of life, while it was accompanied by personal information leakage and abuse risk, and many kinds of hardware/software security products for preventing the personal information leakage and the abuse risk were released.

The security products are mostly implemented based on mathematically safe encryption algorithms and various safety assessment techniques.

In general, when executing an operation of fast Fourier transform (FFT), an encryption key for a 2D image is applied to an input terminal or an output terminal to encrypt the 2D image.

However, when the 2D image is encrypted using the operation of the fast Fourier transform, encryption keys of the same number as pixels for the 2D image should be applied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an encryption method, includes performing, by an encryption system, bit reversal permutation of pixel data of a 2D image, arranging the pixel data as first-pixel data, and applying the 2D image to a butterfly algorithm of fast Fourier transform; determining, by the encryption system, a plurality of data paths based on the first-pixel data; and performing, by the encryption system, a first encryption of the first-pixel data into second-pixel data on a specific data path based on a number of the specific data path among the plurality of data paths.

In the arranging of the first-pixel data, pixel data of the 2D image may be separated into row pixel data and column pixel data of a 1D image, and each of the row pixel data and the column pixel data may be arranged as the first-pixel data based on the bit reversal permutation.

In the determining of the plurality of data paths, the number of the plurality of data paths may be determined based on the number of the first-pixel data.

In the first encryption, the number of the specific data path may be weighted to the first-pixel data, and the first-pixel data may be encrypted to the second-pixel data.

After the first encryption, a data array index of the second-pixel data may be converted by the encryption system into a binary number, bits of the binary number may be shifted, the shifted binary number may be converted into a decimal number, and the data array index may be rearranged to perform a second encryption of the second-pixel data to third-pixel data.

After the second encryption, a third encryption of the third-pixel data to fourth-pixel data may be performed by the encryption system by applying a set twiddle factor.

In the third encryption, the third-pixel data may be multiplied by the twiddle factor and the third-pixel data is encrypted to the fourth-pixel data.

A non-transitory computer-readable storage medium storing instructions that, when executed by one or more processors, configure the one or more processors to perform the method above.

In another general aspect, an encryption system, includes one or more processors configured to: perform bit reversal permutation of pixel data of a 2D image, arrange the pixel data as first-pixel data, and apply the 2D image to a butterfly algorithm of fast Fourier transform; determine a plurality of data paths based on the first-pixel data; and perform a first encryption of the first-pixel data into second-pixel data on a specific data path based on a number of the specific data path among the plurality of data paths.

The one or more processors are further configured to separate pixel data of the 2D image into row pixel data and column pixel data of a 1D image, and arrange each of the row pixel data and the column pixel data as the first-pixel data based on the bit reversal permutation.

The one or more processors are further configured to determine the number of the plurality of data paths based on the number of the first-pixel data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object to be achieved by the present disclosure is to provide an encryption method of an image, which encrypts an input 2D image by applying fast Fourier transform to enhance security and increase the data processing speed during the fast Fourier transform.

According to the present disclosure, there is an advantage in that in an encryption method of an image, when fast Fourier transform is applied, an input 2D image is encrypted by applying ultra-speed data processing and a simple encryption key to enhance security.

Figure 1:
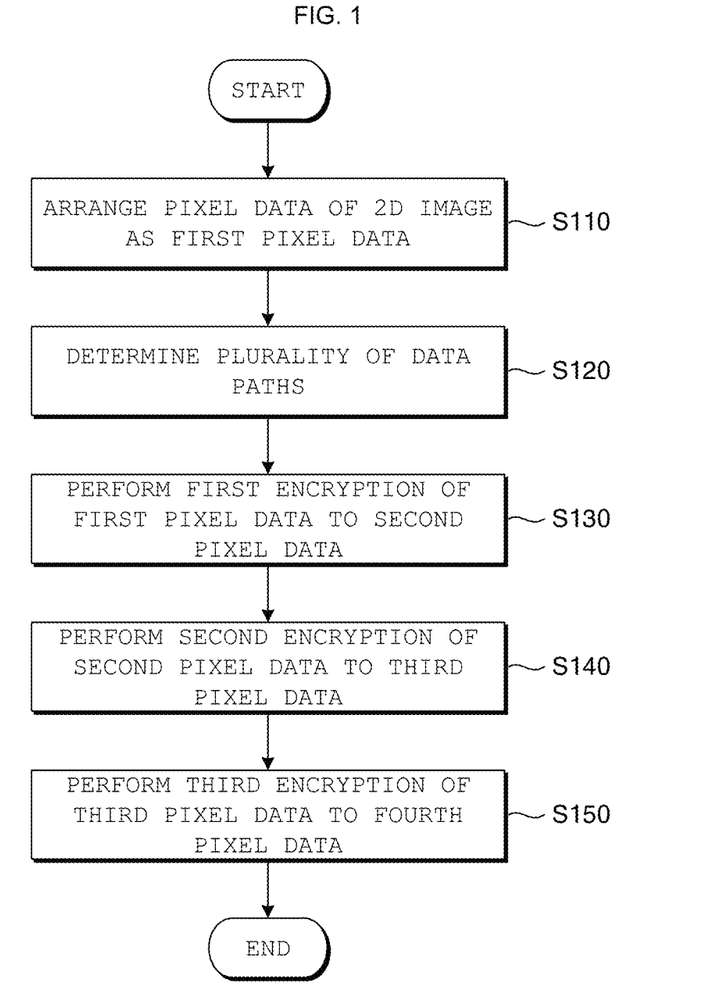
FIG. 1 is a flowchart illustrating an example of an encryption method of an image according to the present disclosure.
Figure 2:
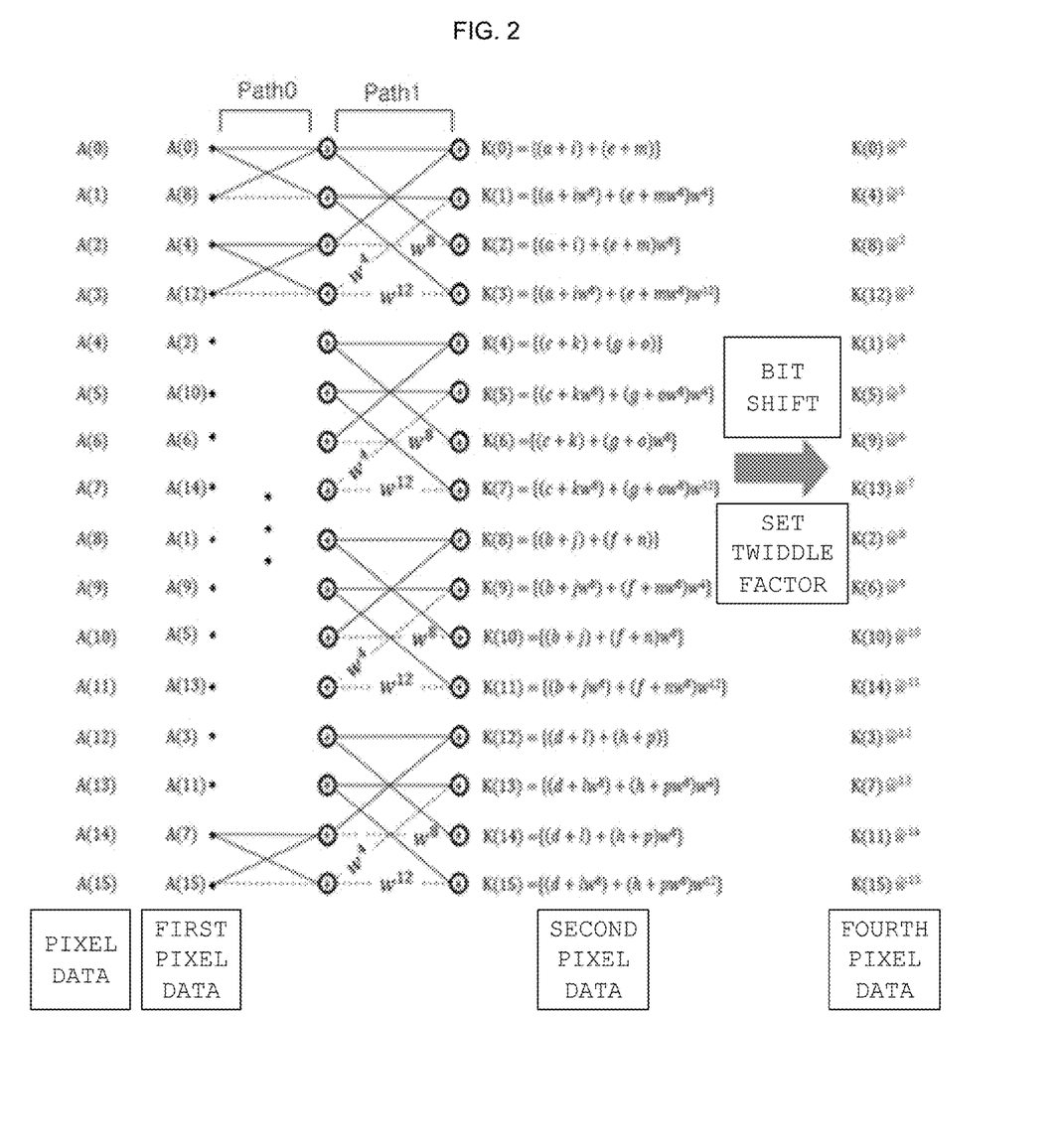
FIGS. 2 and 3 are diagrams describing examples of encryption and decryption of an image according to the present disclosure.
Figure 3:
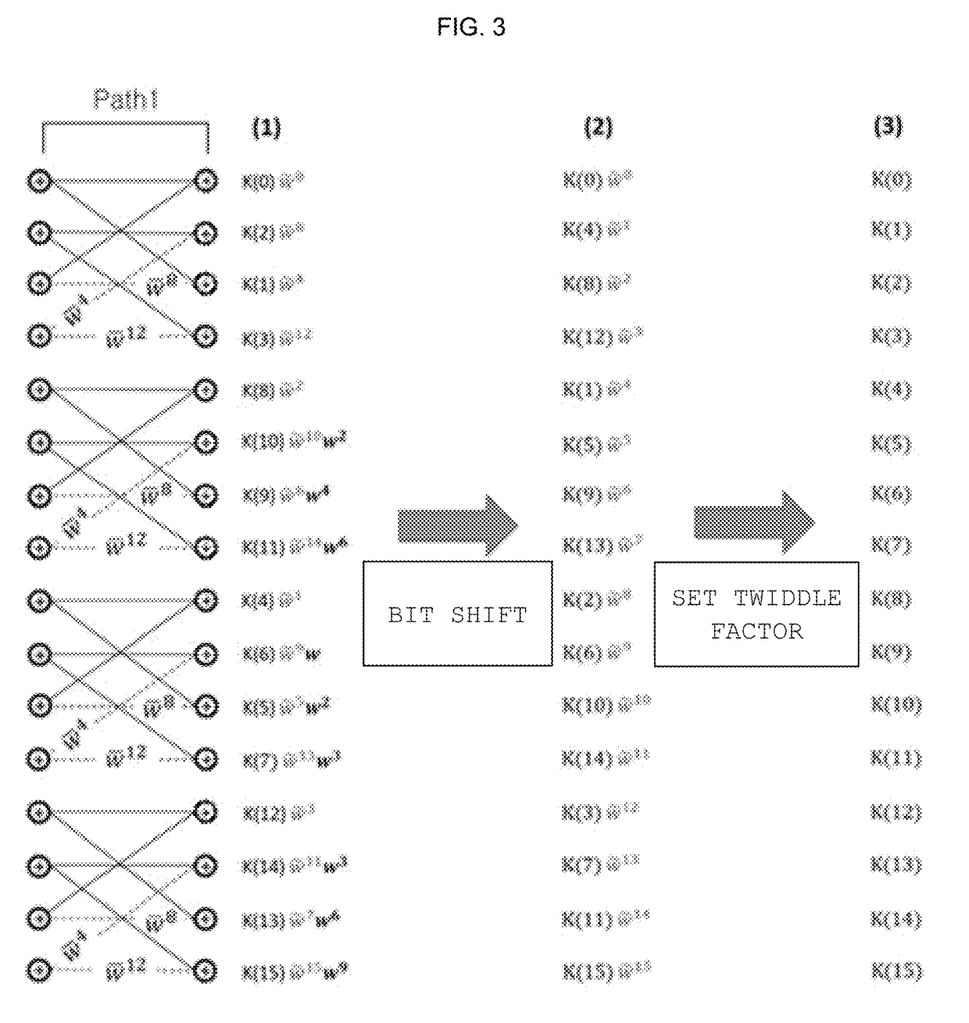

FIG. 1 is a flowchart illustrating an example of an encryption method of an image according to the present disclosure, and FIGS. 2 and 3 are diagrams describing examples of encryption and decryption of an image according to the present disclosure.

Referring to FIGS. 1 to 3, an encryption system may encrypt and decrypt an input 2D image through fast Fourier transform. The encryption system may be, or included in, an external device.

FIG. 1 illustrates an example of a method for encrypting an input 2D image in the encryption system, and the encryption system may decrypt the 2D image encrypted by the encryption system. In an example, an external device is linked with the encryption system and may decrypt the encrypted 2D image, but the present disclosure is not limited thereto. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

When FIG. 1 is described, the encryption system may arrange first-pixel data by bit reversal permutation of pixel data of the 2D image in order to apply the input 2D image to a butterfly algorithm of the fast Fourier transform (S110).

The encryption system may separate pixel data of the 2D image into row pixel data and column pixel data of a 1D image, and arrange each row pixel data and column pixel data as the first-pixel data according to the bit reversal permutation.

In an embodiment, the first-pixel data may be any one of the row pixel data and the column pixel data, but is not limited thereto.

The encryption system may determine a plurality of data paths according to the first-pixel data (S120).

The encryption system may determine the number of the plurality of data paths according to the number of first-pixel data.

The encryption system may perform first encryption of the first-pixel data into second-pixel data on a specific data path based on a number of the specific data path among the plurality of data paths (S130).

The encryption system may weigh the number of the specific data path to the first-pixel data and encrypt the first-pixel data to the second-pixel data.

The encryption system converts a data array index of the second-pixel data into a binary number, shifts bits of the binary number, converts the shifted binary number into a decimal number, and rearranges the data array index to perform second encryption of the second-pixel data to third-pixel data (S140).

The encryption system may perform third encryption of the third-pixel data to fourth-pixel data by applying a set twiddle factor (S150).

The encryption system may multiply the third-pixel data by the twiddle factor and encrypt the third-pixel data to the fourth-pixel data.

FIG. 2 illustrates an example of a process of encrypting the pixel data of the 2D image illustrated in FIG. 1 to the fourth-pixel data.

First, when the number of pixel data of the 2D image is M, the encryption system may determine the number of data paths of the fast Fourier transform as $\log_2 M$.

When the number of pixel data is M=16, the encryption system may be performed through four data paths when being applied to the butterfly algorithm of the fast Fourier transform.

In FIG. 2, a second data path Path1 is set as a specific data path, and an operation by the butterfly algorithm is represented in the specific data path.

Referring to FIG. 2, the encryption system may perform bit reversal permutation of pixel data A(0) to A(15) and arrange the corresponding pixel data as the first-pixel data.

In this case, the first-pixel data is acquired by changing an array for an order of the pixel data A(0) to A(15).

Here, since the encryption system performs the first encryption of the first-pixel data in the second data path Path1, the number of the specific data path may be applied as an encryption key.

The encryption system may weigh the number of the specific data path to the first-pixel data and generate the second-pixel data.

Thereafter, the encryption system may apply a bit shift method to second-pixel data K(j) encrypted through the second data path Path1 and shuffle a data array, and encrypt the second-pixel data to the third-pixel data.

That is, the encryption system converts a data array index of the second-pixel data into a binary number, shifts bits of the binary number, converts the shifted binary number into a decimal number, and rearranges the data array index to encrypt the second-pixel data to the third-pixel data.

For example, when a fifth index of data in which M=256, i.e., j=5, is expressed by the binary number, the index may be 0000 0101. When a right bit shift is performed for 0000 0101, a binary number 1000 0010 may be obtained.

In this case, since the binary number means 130, the decimal number, the binary number means that the original fifth data moves to a 130-th location.

Thereafter, the encryption system may encrypt the third-pixel data to the fourth-pixel data by applying the set twiddle factor.

The encryption system may constitute the above-described encryption key, i.e. the specific data path, the bit shift, and the set twiddle factor as one set.

FIG. 3 illustrates an example of a process of decrypting the fourth-pixel data encrypted in FIG. 2 to the pixel data.

The encryption system may perform 2D inverse fast Fourier transform (IFFT) for data restoration, and decrypt data by using six encryption keys (including three encryption keys encrypting each of row and column pixel data) previously used by finding the corresponding data path which is previously encrypted.

Figure 4:
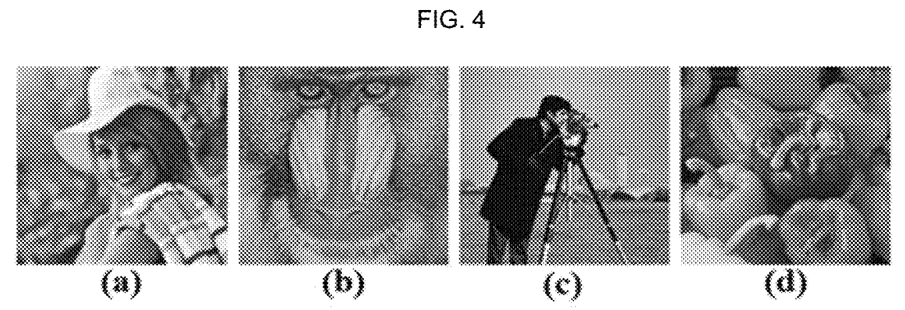
FIGS. 4 to 6 are diagrams describing examples of encryption of an image and decryption of the encrypted image according to the present disclosure.
Figure 5:
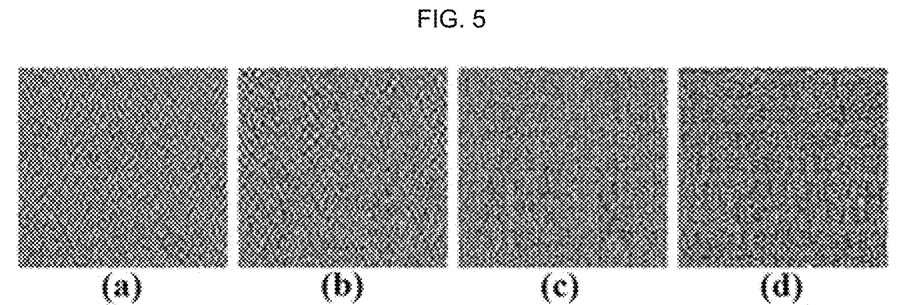
Figure 6:
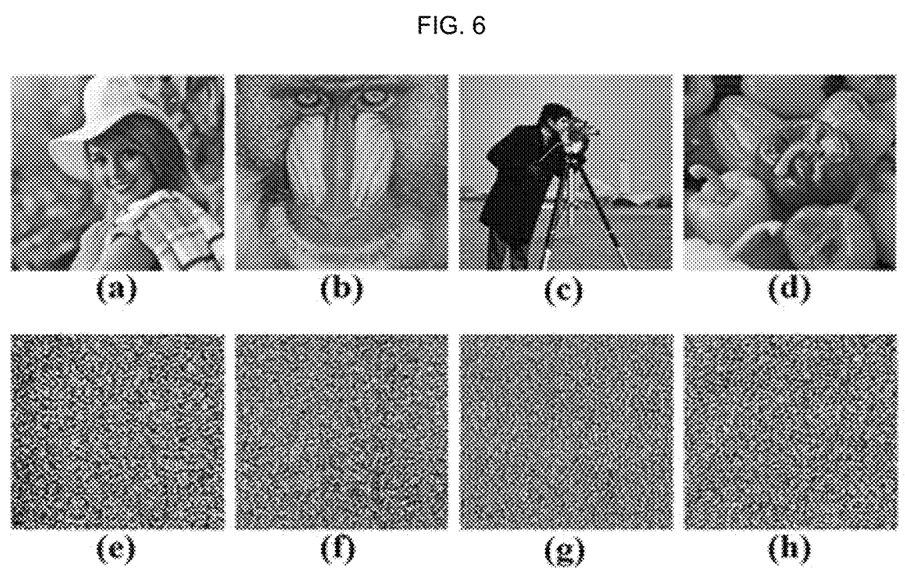

FIGS. 4 to 6 are diagrams for describing examples of encryption of an image and decryption of the encrypted image according to the present disclosure.

FIGS. 4A to 4D illustrate a 2D image input into the encryption system, FIGS. 5A to 5D illustrate an image encrypted in the encryption system, FIGS. 6A to 6D illustrate a 2D image acquired by decrypting the encrypted image of FIGS. 5A to 5D, and FIGS. 6E to 6H illustrate an image acquired when the encrypted image of FIGS. 5A to 5D is not decrypted.

That is, the encryption system encrypts the input 2D image of FIG. 4A to 4D as mentioned in FIG. 1 to generate an encryption image in which data is encrypted with white noise completely, as illustrated in FIGS. 5A to 5D.

FIGS. 6A to 6D illustrate an example of a 2D image restored by using an accurate restoration key, and FIGS. 6E to 6H illustrate a result restored by using a wrong restoration key.

FIGS. 6E to 6H may illustrate the image illustrated in FIGS. 5A to 5D.

As a non-exhaustive example only, an external device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Figure 7:
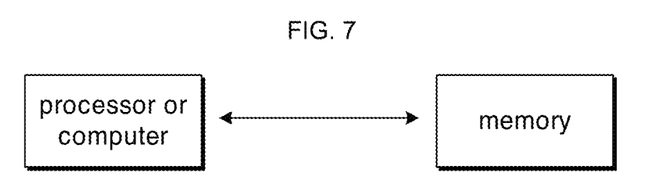
FIG. 7 is hardware components of an encryption system according to the present disclosure.

FIG. 7 is hardware components of an encryption system according to the present disclosure. The encryption system in FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An processor-implemented encryption method, comprising:
    performing, by an encryption system, bit reversal permutation of pixel data of a 2D image, arranging the pixel data as first-pixel data, and applying the 2D image to a butterfly algorithm of fast Fourier transform;
    determining, by the encryption system, a plurality of data paths based on the first-pixel data; and
    performing, by the encryption system, a first encryption of the first-pixel data into second-pixel data on a specific data path based on a number of the specific data path among the plurality of data paths.

2. The encryption method of claim 1, wherein in the arranging of the first-pixel data, pixel data of the 2D image is separated into row pixel data and column pixel data of a 1D image, and each of the row pixel data and the column pixel data is arranged as the first-pixel data based on the bit reversal permutation.

3. The encryption method of claim 1, wherein in the determining of the plurality of data paths, the number of the plurality of data paths is determined based on the number of the first-pixel data.

4. The encryption method of claim 1, wherein in the first encryption, the number of the specific data path is weighted to the first-pixel data, and the first-pixel data is encrypted to the second-pixel data.

5. The encryption method of claim 1, further comprising:
after the first encryption,
converting, by the encryption system, a data array index of the second-pixel data into a binary number, shifting bits of the binary number, converting the shifted binary number into a decimal number, and rearranging the data array index to perform a second encryption of the second-pixel data to third-pixel data.

6. The encryption method of claim 5, further comprising:
after the second encryption,
performing, by the encryption system, a third encryption of the third-pixel data to fourth-pixel data by applying a set twiddle factor.

7. The encryption method of claim 6, wherein in the third encryption, the third-pixel data is multiplied by the twiddle factor and the third-pixel data is encrypted to the fourth-pixel data.

8. A non-transitory computer-readable storage medium storing instructions that, when executed by one or more processors, configure the one or more processors to perform the method of claim 1.

9. An encryption system, comprising:
one or more processors configured to:
perform bit reversal permutation of pixel data of a 2D image, arrange the pixel data as first-pixel data, and apply the 2D image to a butterfly algorithm of fast Fourier transform;
determine a plurality of data paths based on the first-pixel data; and
perform a first encryption of the first-pixel data into second-pixel data on a specific data path based on a number of the specific data path among the plurality of data paths.

10. The encryption system of claim 9, wherein the one or more processors are further configured to
separate pixel data of the 2D image into row pixel data and column pixel data of a 1D image, and
arrange each of the row pixel data and the column pixel data as the first-pixel data based on the bit reversal permutation.

11. The encryption system of claim 9, wherein the one or more processors are further configured to determine the number of the plurality of data paths based on the number of the first-pixel data.

* * * * *